(12) United States Patent
Okada et al.

(10) Patent No.: US 8,243,607 B2
(45) Date of Patent: Aug. 14, 2012

(54) PACKET DELAY CHARACTERISTIC MEASURING APPARATUS AND METHOD

(75) Inventors: Sumiyo Okada, Kawasaki (JP);
Noriyuki Fukuyama, Kawasaki (JP);
Masanobu Morinaga, Kawasaki (JP);
Hideaki Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 234 days.

(21) Appl. No.: 12/632,374

(22) Filed: Dec. 7, 2009

(65) Prior Publication Data
US 2010/0085886 A1    Apr. 8, 2010

Related U.S. Application Data

(63) Continuation of application No. PCT/JP2007/064008, filed on Jul. 13, 2007.

(51) Int. Cl.
H04L 12/28 (2006.01)

(52) U.S. Cl. ...................................................... 370/241

(58) Field of Classification Search .......... 370/241–248, 370/252, 253; 455/403, 422–425
See application file for complete search history.

(56) References Cited

U.S. PATENT DOCUMENTS

| | | | | |
|---|---|---|---|---|
| 6,603,975 | B1 * | 8/2003 | Inouchi et al. | 455/450 |
| 6,987,764 | B2 * | 1/2006 | Hsu | 370/390 |
| 7,058,431 | B2 * | 6/2006 | Sasaki | 455/574 |
| 7,127,508 | B2 * | 10/2006 | Edmison et al. | 709/224 |
| 7,260,645 | B2 * | 8/2007 | Bays | 709/238 |
| 7,532,580 | B2 * | 5/2009 | Usukura | 370/252 |
| 7,596,373 | B2 * | 9/2009 | McGregor et al. | 455/425 |
| 7,603,460 | B2 * | 10/2009 | Adya et al. | 709/224 |
| 7,636,321 | B1 * | 12/2009 | Iannaccone et al. | 370/252 |
| 7,665,116 | B2 * | 2/2010 | Hartung et al. | 725/114 |
| 7,818,422 | B2 * | 10/2010 | Patiejunas | 709/224 |
| 7,940,685 | B1 * | 5/2011 | Breslau et al. | 370/251 |
| 2003/0162539 | A1 * | 8/2003 | Fiut et al. | 455/424 |
| 2009/0028057 | A1 * | 1/2009 | Okada et al. | 370/242 |

FOREIGN PATENT DOCUMENTS

| | | |
|---|---|---|
| JP | A 5-30126 | 2/1993 |
| JP | A 2001-333092 | 11/2001 |
| JP | A 2004-221801 | 8/2004 |
| JP | A 2005-311906 | 11/2005 |
| JP | A 2006-340081 | 12/2006 |

* cited by examiner

Primary Examiner — Dmitry H Levitan
(74) Attorney, Agent, or Firm — Fujitsu Patent Center

(57) ABSTRACT

A packet delay characteristic measuring apparatus that can accurately only measure a delay in a network even if a delay may occur also in a device that receives packets. The apparatus includes: a sending section for periodically sending out test packets each including sending time information to the network; a branching section for handing over the test packets flowing from the network to each of a plurality of communication paths by electrically branching a communication path; a plurality of receiving sections each of which is connected to the branching section for receiving the identical test packets and calculating delay times based on the sending time information; and a measurement value determining section for comparing a plurality of delay times calculated by each of the plurality of receiving sections for the identical test packets and determining the smallest delay time value as a measurement value.

17 Claims, 5 Drawing Sheets

FIG.2

```
MEASUREMENT OF DELAY TIME
            │
            ▼
RECEIVE, BY EACH OF FIRST AND SECOND RECEIVERS, TEST PACKETS     ─ 1010
SENT FROM TRANSMITTER FOR SPECIFIED TIME PERIOD TO COLLECT
DELAY TIME DATA
            │
            ▼
SELECT VALID PACKETS FROM TEST PACKETS ACCORDING TO              ─ 1020
SPECIFIED CRITERIA
            │
            ▼
ADOPT DELAY TIME DATA WHOSE VALUE IS SMALLER AS VALID            ─ 1030
DATA FOR EACH PACKET
            │
            ▼
          END
```

FIG.3

| TEST PACKETS | COLLECTED DELAY TIME DATA $d_i$ | |
|---|---|---|
| | FIRST RECEIVER | SECOND RECEIVER |
| P1 | 5 | 5 |
| P2 | 4 | 3 |
| P3 | 9 | 3 |
| P4 | 3 | 3 |
| P5 | 2 | 6 |

PACKET DELAY CHARACTERISTIC MEASURING APPARATUS AND METHOD

CROSS-REFERENCE TO RELATED APPLICATIONS

This application is a continuation of PCT/JP2007/064008, filed on Jul. 13, 2007, the entire contents of which are incorporated herein by reference.

FIELD

The present invention relates to an apparatus and method for measuring delay characteristics of packets transferred in a network.

BACKGROUND

In recent years, as VoIP (Voice over Internet Protocol) and other technologies appear, communication systems, such as IP telephony using IP networks are coming into widespread use. In order to maintain communication quality in the IP networks using the VoIP and the like, it is important to grasp communication status in advance and accurately when network load increases.

Patent Literature 1 given below discloses a method for measuring packet delay times and jitter (fluctuation) characteristics by employing a real network in operation. This method measures transfer delay times by inserting time stamp information into measurement packets at the time of transmission and transferring the measurement packets in a measurement section of the network.

However, in the prior art method, when the measurement is performed by using inexpensive devices such as PC (personal computers) and the like, delays occurs due to the influence of a CPU (central processing unit) and an OS (operating system) in a receiving terminal and this delay in the receiving terminal cannot be distinguished from the delay in the network. Thus, there is a problem in that the delay in the network that is desired to be measured in the first place cannot be measured accurately.

Patent Literature 1: Japanese Unexamined Patent Publication No. 2001-333092

SUMMARY

According to an aspect of the invention, a packet delay characteristic measuring apparatus for measuring delay characteristics of packets transferred in a network includes: a transmitter configured to periodically send out test packets each including sending time information to the network; a branching device configured to output the test packets that are input through the network to each of a plurality of communication paths by electrically branching a communication path; a plurality of receivers each of which is connected to said branching device and configured to receive the identical test packets and calculate delay times based on the sending time information; and a measurement value determining unit configured to compare a plurality of delay times calculated by each of said plurality of receivers for the identical test packets and to determine the smallest delay time value as a measurement value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 2 is a flow chart illustrating a procedure of a delay time measuring process for measuring delay time in the first embodiment of the present invention;

FIG. 3 is a diagram illustrating an exemplary model of collected delay time data;

DESCRIPTION OF EMBODIMENTS

Figure 1:
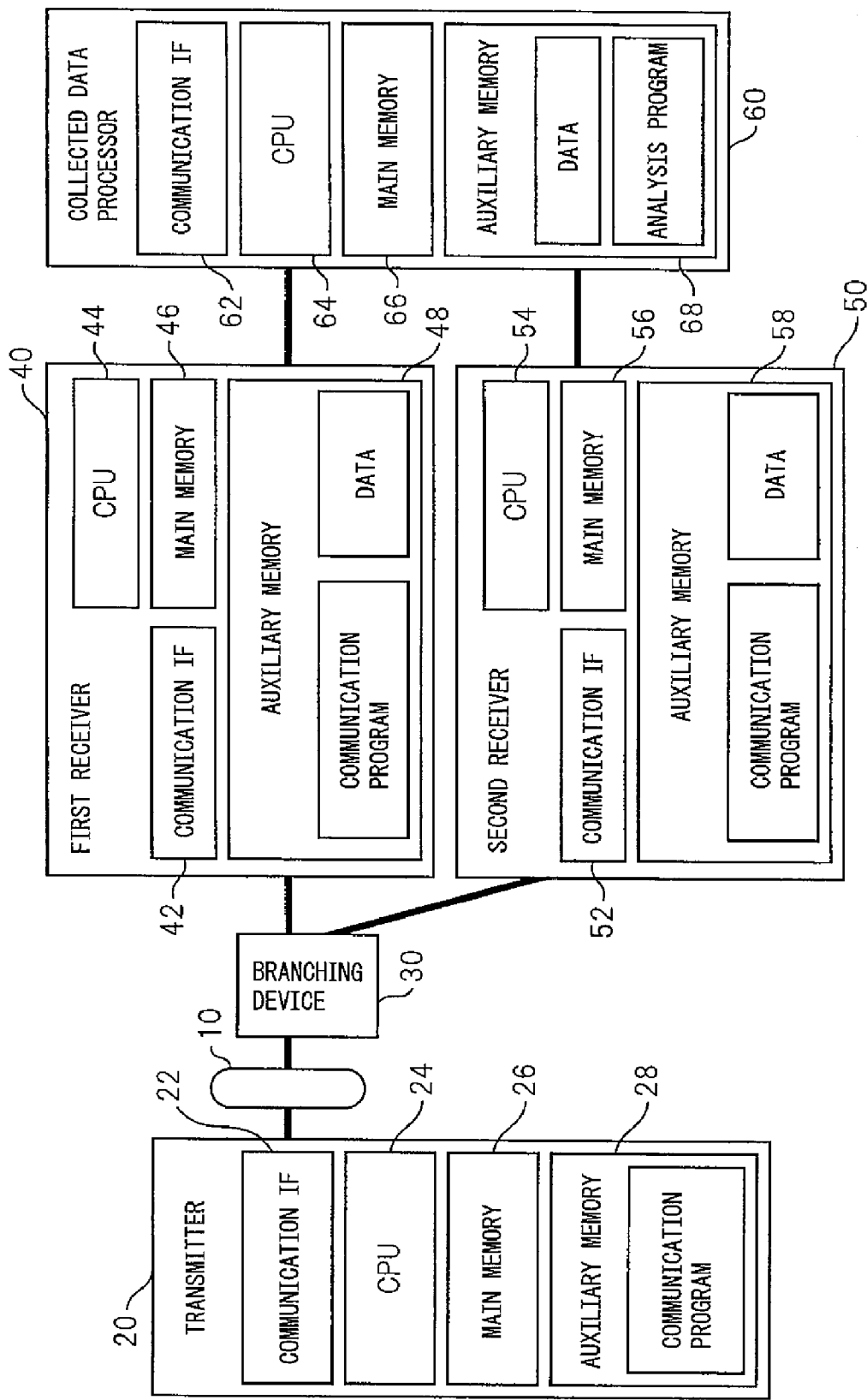
FIG. 1 is a block diagram illustrating a first embodiment of a packet delay characteristic measuring apparatus according to the present invention.

Hereinafter, embodiments of the present invention will be described with reference to the accompanying drawings. FIG. 1 is a block diagram illustrating a first embodiment of a packet delay characteristic measuring apparatus according to the present invention. This packet delay characteristic measuring apparatus measures packet transfer delay times between two nodes in an IP network 10 and it comprises a transmitter 20, a branching device 30, a first receiver 40, a second receiver 50 and a collected data processor 60.

Transmitter 20 is a personal computer (PC) and the like and it comprises a communication interface (IF) 22, a CPU (central processing unit) 24, a main memory 26, an auxiliary memory 28 and the like. Auxiliary memory 28 stores a communication program and the like.

Branching device 30 is a network tap, a wireless access point and the like and it electrically branches a communication path to hand over (deliver) packets flowing from network 10 to each of a plurality of communication paths. In the case of the wireless access point, the communication paths after the branching are wireless.

First receiver 40 is specifically a PC and the like and it comprises a communication interface 42, a CPU 44, a main memory 46, an auxiliary memory 48 and the like. Second receiver 50 is similar to first receiver 40 and it comprises a communication interface 52, a CPU 54, a main memory 56, an auxiliary memory 58 and the like. Each of auxiliary memories 48 and 58 stores the communication program, collected data and the like are stored in.

Collected data processor 60 is also a PC and the like and it comprises a communication interface 62, a CPU 64, a main memory 66, an auxiliary memory 68 and the like. Auxiliary memory 68 stores collected data and an analysis program for processing the data and the like.

Further, each of the communication interfaces in transmitter 20, first receiver 40, second receiver 50 and collected data processor 60 comprises a NIC (network interface card) and the like. Then, each of transmitter 20, first receiver 40, second receiver 50 and collected data processor 60 operates according to the program loaded from the auxiliary memory to the main memory to implement its processing functions.

In the configuration illustrated in FIG. 1, transmitter 20 generates test packets addressed to first receiver 40 and periodically sends them to network 10. Each test packet includes sending time information. Branching device 30 not only delivers the test packets flowing from network 10 to first receiver 40 but also delivers identical test packets to second receiver 50.

A procedure of a delay time measuring process based on the test packets is illustrated in the flow chart of FIG. 2. First, each of first receiver 40 and second receiver 50 receives the sent test packets and calculates delay times for each test packet for a specified time period, so as to collect delay time data (step 1010). Each delay data is calculated as a difference between receiving time $R_i$ and sending time $S_i$ ($R_i-S_i$) or, in other words, absolute delay time $d_i$. The delay time data collected by first receiver 40 and second receiver 50 is sent to collected data processor 60.

Next, an analysis program in collected data processor 60 selects valid packets from the test packets according to specified criteria (step 1020). For example, the delay time data with respect to the test packets P1 to P5 is collected as illustrated in FIG. 3. In this case, as a first criterion, it is used to unconditionally select all the test packets P1 to P5 as the valid packets.

Next, as a second criterion, the test packets P1, P2 P4 and P5 of which the difference between the delay time calculated by first receiver 40 and the delay time calculated by second receiver 50 is less than a specified threshold 5 may be selected as the valid packets. This is because if such difference is large, there may be reliability problems.

Further, as a third criterion, the test packets P1 and P4 of which the delay time calculated by first receiver 40 coincides with the delay time calculated by second receiver 50 may be selected as the valid packets. This is because the data in such case may be reliable.

Next, the analysis program in collected data processor 60 adopts the delay time data whose value is smaller as valid data for each of the valid packets, so as to eventually determine measurement data (step 1030). This is because the larger value data is increased because delay time resulting from processing inside the receiver is added to it.

For example, when all of the test packets P1 to P5 are selected as the valid packets according to the first criterion described above, the delay time 5 for P1, the delay time 3 for P2, the delay time 3 for P3, the delay time 3 for P4 and the delay time 2 for P5 are obtained as the valid measurement values. When the test packets P1, P2, P4 and P5 are selected as the valid packets according to the second criterion described above, the delay time 5 for P1, the delay time 3 for P2, the delay time 3 for P4 and the delay time 2 for P5 are obtained as the valid measurement values. When the test packets P1 and P4 are selected as the valid packets according to the third criterion described above, the delay time 5 for P1 and the delay time 3 for P4 are obtained as the valid measurement values.

Though the data is collected by the two receivers in the first embodiment described above, the data may of course be collected by three or more receivers. The higher the number of receivers, the more accurate measurement values can be obtained. Further, the analysis program provided in collected data processor 60 may alternatively be stored in the auxiliary memory of first receiver 40 or second receiver 50 to allow either receiver to perform the process of FIG. 2, so that collected data processor 60 may be omitted.

Figure 4:
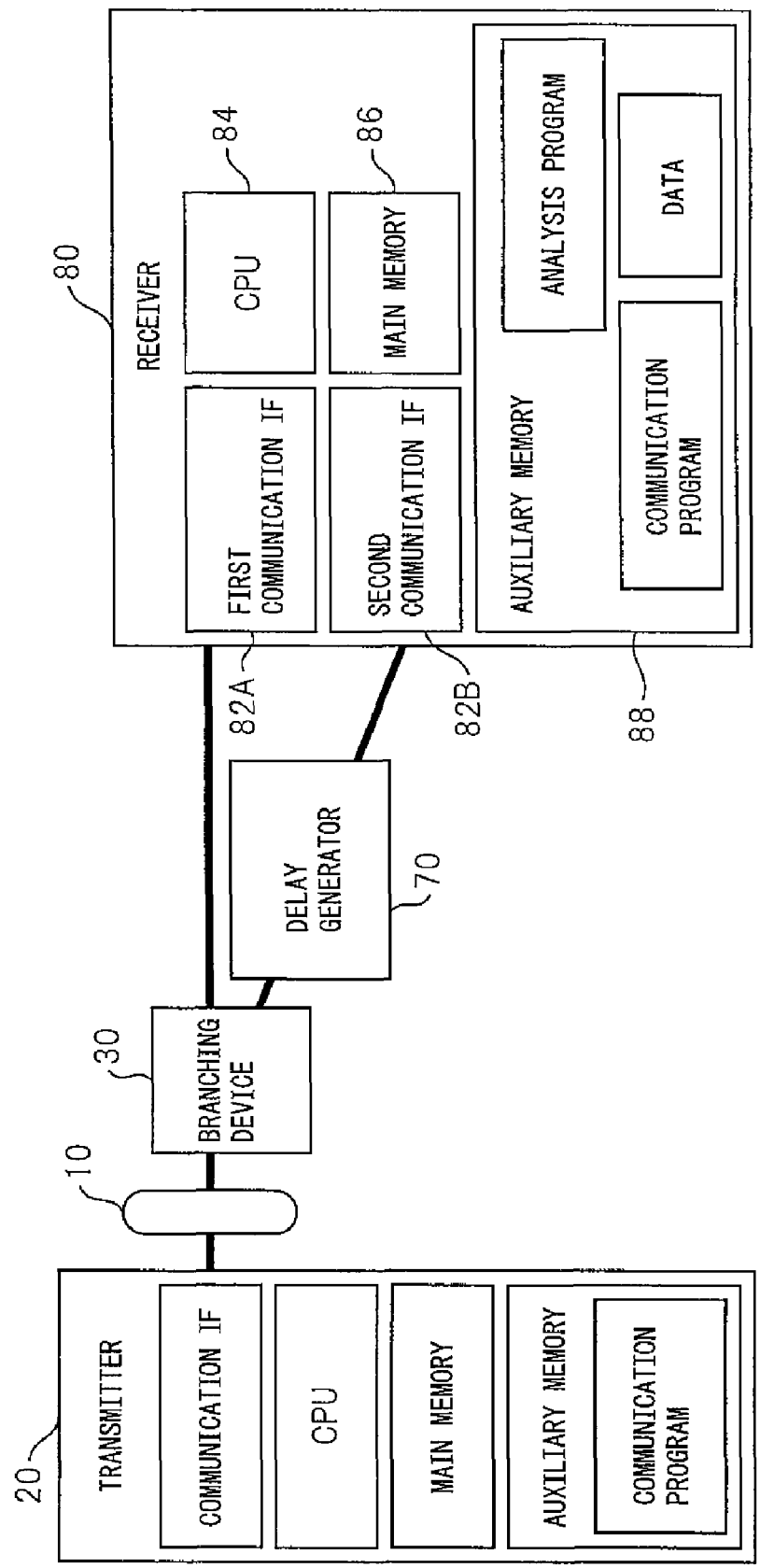
FIG. 4 is a block diagram illustrating a second embodiment of a packet delay characteristic measuring apparatus according to the present invention.

FIG. 4 is a block diagram illustrating a second embodiment of a packet delay characteristic measuring apparatus according to the present invention. In the second embodiment illustrated in this figure, in comparison with the first embodiment illustrated in FIG. 1, transmitter 20 and branching device 30 are identical but only one receiver is provided and a collected data processor is not provided.

However, a receiver 80 in the second embodiment comprises a first communication interface 82A, a second communication interface 82B, a CPU 84, a main memory 86, an auxiliary memory 88 and the like. Thus, two communication interfaces each comprising a NIC and the like are provided. Further, auxiliary memory 88 stores not only a communication program and the data, but also an analysis program. As a result, receiver 80 in the second embodiment implements the functions of first receiver 40, second receiver 50 and collected data processor 60 in one device.

However, in the receiver 80 in which one CPU performs the processes, when first communication interface 82A and second communication interface 82B simultaneously receive an identical test packet, the two communication interfaces are simultaneously affected by the one CPU. In this case, the difference between the delay times resulting from the process in the receiver does not occur, and as a result, the effect of the present invention is not exhibited. Therefore, in the second embodiment of FIG. 4, a delay generator 70 for giving a fixed delay time to the packets is provided in a communication path between branching device 30 and second communication interface 82B of receiver 80. This delay generator 70 comprises a switch and the like. Because the fixed delay time is given to the packets in the communication path between branching device 30 and second communication interface 82B of receiver 80, the two communication interfaces become not simultaneously affected by the one CPU.

In this second embodiment, because arrival of the test packet at second communication interface 82B is always later than its arrival at first communication interface 82A, two delay times with respect to an identical test packet cannot be simply compared. Therefore, in the second embodiment, after calculating the absolute delay time $d_i$ that is the difference between receiving time $R_i$ and sending time $S_i$ ($R_i-S_i$), relative delay time $D_i$ is calculated.

Figure 5:
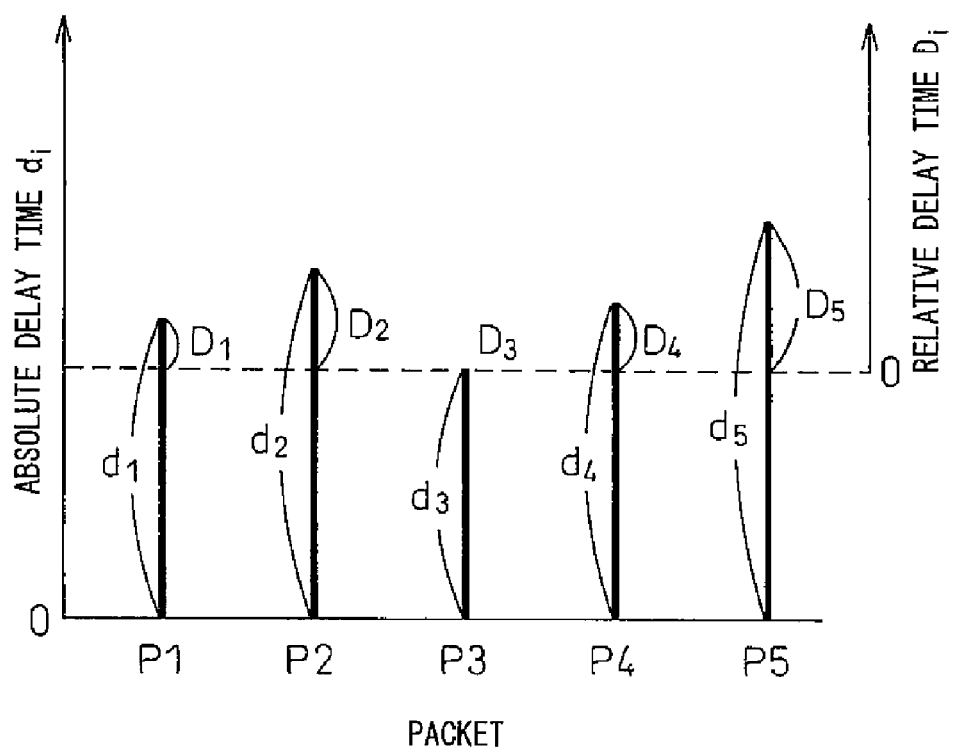
FIG. 5 is a diagram for describing relative delay time.

FIG. 5 is a diagram for describing the relative delay time $D_i$. As illustrated in this figure, after determining the absolute delay times $d_1, d_2, d_3, d_4$ and $d_5$ for the test packets P1, P2, P3, P4 and P5, respectively, the smallest value $d_3$ is determined. Then, the relative delay times $D_1, D_2, D_3, D_4$ and $D_5$ for the test packets P1, P2, P3, P4 and P5, respectively, are calculated as $d_1-d_3$, $d_2-d_3$, $d_3-d_3(=0)$, $d_4-d_3$ and $d_5-d_3$. Thus, with respect to the absolute delay time $d_i$, the relative delay time $D_i$ is defined as $D_i=d_i-\min$ (all $d_i$).

Figure 6:
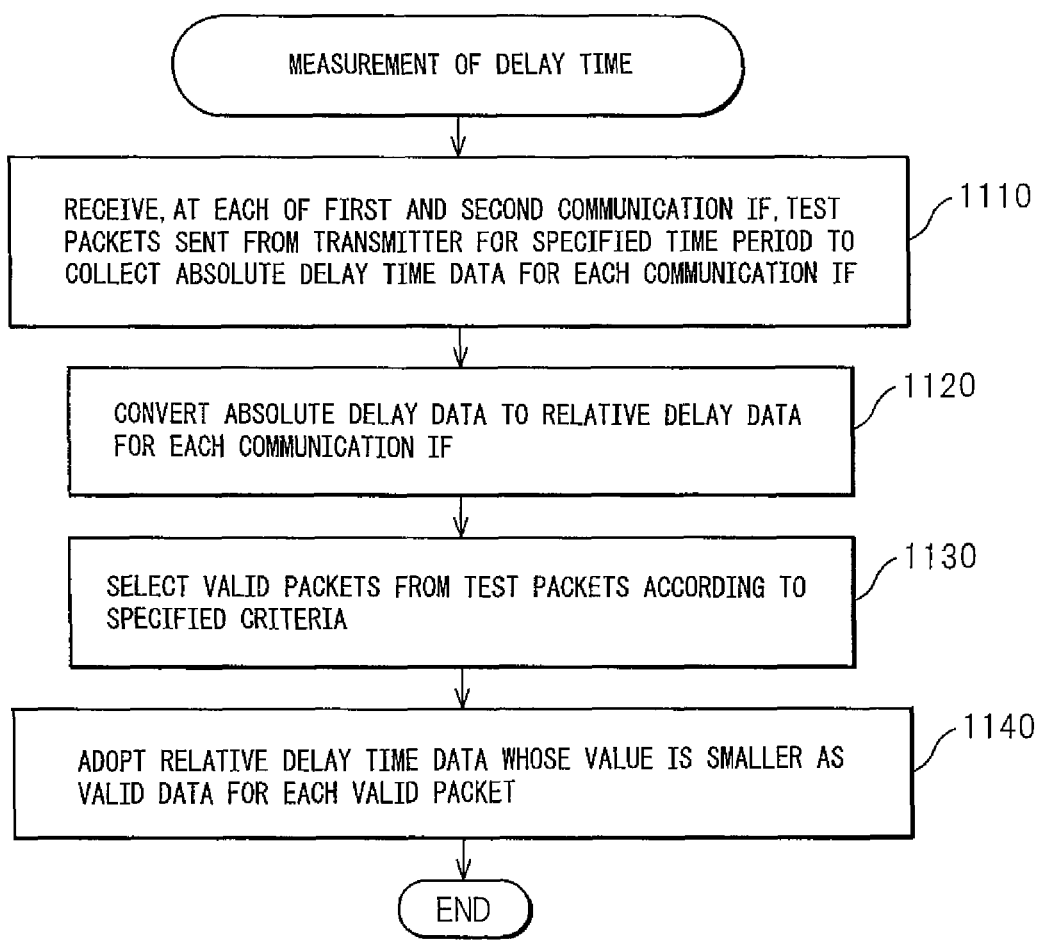
FIG. 6 is a flow chart illustrating a procedure of a delay time measuring process in the second embodiment of the present invention.

FIG. 6 is a flow chart illustrating a procedure of a delay time measuring process in the second embodiment. First, receiver 80 receives the test packets at first communication interface 82A and second communication interface 82B for a specified time period and calculates the absolute delay times for each test packet, so as to collect the absolute delay time data for each communication interface (step 1110).

Next, as described with reference to FIG. 5, receiver 80 converts the absolute delay data to the relative delay data for each communication interface (step 1120).

Next, similar to step 1020 in FIG. 2, receiver 80 selects valid packets from the test packets according to specified criteria (step 1130). But, in this case, the criteria are applied not to the absolute delay time data but to the relative delay time data.

Finally, among the data with respect to first communication interface 82A and the data with respect to second communication interface 82B for each of the valid packets, receiver 80 adopts the relative delay time data whose value is smaller as valid data, so as to determine final measurement values (step 1140).

As the packet delay characteristics, not the delay times themselves but fluctuations in the delay times are important. Therefore, it is sufficient to measure the relative delay time as in the second embodiment. On the other hand, based on the determined relative delay time measurement data and the absolute delay time smallest value with respect to first communication interface 82A, the absolute delay time measurement values may be calculated anew.

Though the data is collected by the two communication interfaces in the second embodiment described above, the data may of course be collected by three or more communication interfaces. The higher the number of communication interfaces, the more accurate measurement values can be obtained. However, note that the fixed delay times have to be set to different values for each path.

Although the embodiments of the present invention have been described, the present invention is of course not limited thereto and various embodiments may be adopted. For example, in the first embodiment, the series of processes including the comparison and the like may be performed after converting the absolute delay time to the relative delay time. In the first embodiment, timers provided in transmitter 20, first receiver 40 and second receiver 50 have to be synchronized as the precondition. This limitation is removed by adopting the relative delay time.

Because the packet delay characteristic measuring apparatus and method according to the present invention receives identical packets flowing from a network at a plurality of receiving means and determines a plurality of delay times, and then compares the plurality of delay times with each other and adopts the smallest delay time value as a measurement value, delay occurring due to the receiving means can be removed and measurement accuracy can be improved.

What is claimed is:

1. A packet delay characteristic measuring apparatus for measuring delay characteristics of packets transferred in a network, the apparatus comprising:
   a transmitter configured to periodically send out test packets each including sending time information to the network;
   a branching device configured to output the test packets that are input through the network to each of a plurality of communication paths by branching a communication path;
   a plurality of receivers each of which is connected to each of the communication paths and configured to receive the test packets and calculate delay times based on the sending time information; and
   a measurement value determining unit configured to combine the delay times calculated by individual receivers for a comparison, compare the calculated delay times for the test packets and determine the smallest delay time of the calculated delay times for the test packets as a measurement value.

2. The packet delay characteristic measuring apparatus according to claim 1, wherein each of said plurality of receivers calculates absolute delay times each of which is a difference between receiving time and sending time as the delay times.

3. The packet delay characteristic measuring apparatus according to claim 1, wherein each of said plurality of receivers determines absolute delay times each of which is a difference between receiving time and sending time for a plurality of test packets and, then, calculates relative delay times with reference to the smallest value of the absolute delay times as the delay times.

4. The packet delay characteristic measuring apparatus according to claim 3, further comprising delay generators each for giving respective fixed delay times different from each other between said branching device and each of said plurality of receivers except one of them, wherein said plurality of receivers comprise a plurality of communication interface units corresponding to each of them and a single delay time calculating unit common to each of them.

5. The packet delay characteristic measuring apparatus according to claim 1, wherein said measurement value determining unit selects only the test packets satisfying specified criteria among those received by said plurality of receivers as valid test packets to be compared.

6. The packet delay characteristic measuring apparatus according to claim 1, wherein communication paths after the branching by said branching device are wireless.

7. A packet delay characteristic measuring method for measuring delay characteristics of packets transferred in a network, the method comprising:
   by a transmitter, periodically sending out test packets each including sending time information to the network;
   by a branching device that branches a communication path, outputting the test packets that are input through the network to each of a plurality of communication paths;
   by a plurality of receivers each of which is connected to each of the communication paths, receiving the test packets and calculating delay times based on the sending time information; and
   by a measurement value determining unit, combining the delay times calculated by individual receivers for a comparison, comparing the calculated delay times for the test packets and determining the smallest delay time of the calculated delay times for the test packets as a measurement value.

8. A packet delay characteristic measuring method according to claim 7, wherein the process by each of said plurality of receivers is to calculate absolute delay times each of which is a difference between receiving time and sending time as the delay times.

9. A packet delay characteristic measuring method according to claim 7, wherein the process by each of said plurality of receivers is to determine absolute delay times each of which is a difference between receiving time and sending time for a plurality of test packets and, then, calculate relative delay times with reference to the smallest value of the absolute delay times as the delay times.

10. The packet delay characteristic measuring method according to claim 9, further comprising: by each delay generator, giving respective fixed delay times different from each other between said branching device and each of said plurality of receivers except one of them, wherein the process by said plurality of receivers comprises a process by a plurality of communication interface units corresponding to each of them and a process by a single delay time calculating unit common to each of them.

11. The packet delay characteristic measuring method according to claim 7, wherein the process by said measurement value determining unit is to select only the test packets satisfying specified criteria among those received by said plurality of receivers as valid test packets to be compared.

12. The packet delay characteristic measuring method according to claim 7, wherein communication after the branching by said branching device is performed wirelessly.

13. A non-transitory computer readable medium having a program recorded thereon for causing a computer to execute a process for measuring delay characteristics of packets transferred in a network, the process comprising:

combining the delay times of test packets calculated by individual receivers for a comparison, each of the receivers connected to one of a plurality of communication paths for receiving test packets sent through the network;

comparing the calculated delay times for the test packets;

determining, as a result of the comparison, the smallest delay time of the calculated delay times for the test packets as a measurement value.

14. The non-transitory computer readable medium according to claim 13, wherein the delay times are absolute delay times each of which is a difference between receiving time and sending time.

15. The non-transitory computer readable medium according to claim 13, wherein the delay times are relative delay times calculated with reference to the smallest value of absolute delay times each of which is, in turn, determined as a difference between receiving time and sending time for a plurality of test packets.

16. The non-transitory computer readable medium according to claim 13, wherein the process further comprises:

selecting the test packets satisfying specified criteria among those received by said plurality of receivers as valid test packets to be compared.

17. A packet delay characteristic measuring apparatus for measuring delay characteristics of a packet transferred in a network, the apparatus comprising:

a transmitter configured to send out a test packet including sending time information to the network;

a branching device configured to output the test packet that is input through the network to each of a plurality of communication paths by branching a communication path;

a plurality of receivers each of which is connected to said branching device and configured to receive the test packet and calculate a delay time based on the sending time information; and a measurement value determining unit configured to combine the delay times calculated by individual receivers for a comparison, compare the calculated delay times for the test packet and determine the smallest delay time of the delay times calculated for the test packet as a measurement value.

* * * * *